United States Patent Office 2,826,564
Patented Mar. 11, 1958

2,826,564

FLUORINATED ACRYLATES AND POLYMERS

Frank A. Bovey, Dellwood, and Joseph F. Abere, White Bear Township, Ramsey County, Minn., assignors to Minnesota Mining and Manufacturing Company, St. Paul, Minn., a corporation of Delaware No Drawing. Application February 15, 1957
Serial No. 640,348

7 Claims. (Cl. 260—83.5)

This application is a continuation-in-part of our co-pending application, S. N. 399,568, filed Dec. 21, 1953, now abandoned.

This invention relates to our discovery of a new and useful class of fluorinated acrylate esters and their polymers.

These novel esters are polymerizable monomers that can be homopolymerized to provide rubbery polymers which can be vulcanized. Vulcanized rubbers can be obtained which have a unique combination of useful properties—including low-temperature flexibility; excellent resistance to oxidation by air, pure oxygen and ozone; excellent resistance to hydrocarbon fuels, and to aliphatic and aromatic oils, ester type hydraulic fluids and synthetic lubricants, and common organic solvents; excellent resistance to nitric acid; and stability even at elevated temperatures (up to at least 175° C.). The homopolymers can be vulcanized with polyfunctional amine curing agents, and in other ways. The monomer esters can be copolymerized with butadiene and other ethylenic monomers, and these copolymers can be vulcanized with sulfur, as well as in various ways applicable to the homopolymers. The usefulness of the polymers is greatly enhanced by their abiilty to be readily vulcanized. Swelling in liquids is diminished, and stability, tensile strength and elasticity are increased.

These acrylate ester monomers are the normal 3-perfluoroalkoxy-1, 1-dihydroperfluoropropyl acrylates which contain 3 to 6 fully fluorinated carbon atoms in the molecule and can be represented by the following formulas, the second being in abbreviated form:

$$CH_2{:}CHCOOCH_2CF_2CF_2O(CF_2)_nF$$
$$CH_2{:}CHCOOCH_2C_2F_4OC_nF_{2n+1}$$

where the subscript $n$ has an integer value of 1 to 4.

These compounds are the esters of acrylic acid ($CH_2{:}CHCOOH$) and the normal 3-perfluoroalkoxy-1, 1-dihydroperfluoropropyl alcohols represented by the formulas:

$$F(CF_2)_nOCF_2CF_2CH_2OH$$
$$C_nF_{2n+1}OC_2F_4CH_2OH$$

where the subscript $n$ has an integer value of 1 to 4. These alcohols are believed to be novel.

These alcohol and ester compounds differ in structure and composition from the normal 1, 1-dihydroperfluoroalkyl alcohols and their acrylate esters, containing an uninterrupted terminal chain of 3 or more fully fluorinated carbon atoms (cf. U. S. Patent No. 2,642,416), in that the present compounds contain an "ether" oxygen atom within the fluorocarbon chain. The position of this intermediate oxygen atom is of critical importance to the utility of the polymers made from the esters. It will be noted from the above formulas that this intermediate oxygen atom is linked to the third (gamma) carbon atom, which is the second fluorinated carbon atom, thus being separated from the alcohol or ester oxygen atom by three carbon atoms. The present alcohols may be re- garded as derivatives of normal 1, 1-dihydroperfluoropropyl alcohol wherein a terminal fluorine atom has been replaced by a perfluoroalkoxy group, $F(CF_2)_nO—$. The intermediate oxygen atom is referred to as an "ether" oxygen atom because it links perfluoroalkyl groups in the chain. However, it does not confer "ether" properties as understood in conventional organic chemistry.

The ether oxygen atom in the fluorocarbon chain modifies the properties in a desirable manner. Of particular interest is the fact that it makes possible the obtaining of vulcanized rubbery homopolymers and heteropolymers having improved flexibility at low temperatures combined with good resistance to oils, fuels, hydraulic fluids, lubricants and common organic solvents. Apparently this is due to the oxygen atom permitting rotation and flexibility of the fluorocarbon chain. The vulcanized homopolymers of our acrylates are flexible at temperatures 15 to 30° C. lower than the corresponding vulcanized homopolymers of the acrylates which do not contain the ether oxygen atom. We have also discovered that this oxygen atom does not prevent good high-temperature stability of the polymers. Also of particular interest is the fact that this oxygen atom lowers the refractive index, thereby permitting of obtaining polymers of exceptionally low refractive index.

The perfluoro "ether" chain is both oleophobic and hydrophobic. It is responsible for the homopolymers of the acrylate esters having both water-repellent and oil-repellent surface properties, and being nonflammable in the sense that combustion is not supported. Our acrylate esters and their homopolymers contain at least 49% by weight of combined fluorine. The ester molecules have a terminal trifluoromethyl group, contain at least three fully fluorinated carbon atoms and at least seven fluorine atoms, and the number of fluorine atoms exceeds the number of carbon atoms.

The presence of the oxy-carbonyl groups in the polymer molecule imparts desirable combinative properties. In particular, these active groups enhance adhesion when the polymer is coated on a surface, and produce tackiness in the rubbery polymer mass. The polymers form tenacious films when coated upon a variety of surfaces, including cloths, papers, cellulosic films and metals; due, apparently, to the binding action of the oxy-carbonyl groups and to molecular orientation under the conditions involved in applying surface coatings.

Although our homopolymers are insoluble in common organic solvents, they nevertheless are soluble in certain other solvents and this is a valuable feature as it permits of coating them from solutions. As solvents and plasticizers for these polymers, use can be made of the alkyl esters of fluorocarbon monocarboxylic acids, and of the 1,1-dihydroperfluoroalkyl alcohols and their esters.

The homopolymerization and heteropolymerization of the ester monomers is readily carried out in bulk, solution and emulsion, using the techniques described in the aforesaid U. S. Patent No. 2,642,416. Emulsion polymerization in aqueous media is the preferred procedure, yielding stable translucent latices. Stable latices containing 25-35% solids can be readily obtained.

The compositional structure of the homopolymers is indicated by the following generic formula of the repetitive ester units:

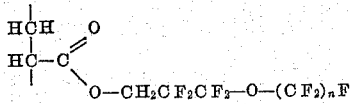

The polymer molecule contains a large number of such units; the vinyl groups being linked together to provide the linear skeletal chain. The 3-perfluoroalkoxy-1,1-dihydroperfluoropropyl groups provide terminal fluorocar-

} bon ether side chains containing three to six fully fluorinated carbon atoms and terminating with a trifluoromethyl group (—CF₃). In the case of heteropolymers, formed by copolymerizing our esters in major proportion by weight, with other polymerizable monomers containing an ethylenic linkage, the skeletal chain of the polymer molecule will contain acrylate ester units of the type indicated by the above formula, in major proportion by weight, as well as units supplied by the co-monomer. Examples of such co-monomers are butadiene, styrene, acrylonitrile, isoprene, vinyl ethers, acrylates, methacrylates, and halogenated derivatives of such monomers, such as perfluorobutadiene and fluoroprene. Use can be made as co-monomers of the 1,1-dihydroperfluoroalkyl acrylate esters which do not contain an ether oxygen atom, $CH_2\!:\!CHCOOCH_2C_nF_{2n+1}$, to obtain polymers having intermediate properties.

Copolymers formed with dienes (for instance copolymers with butadiene) can be cured with conventional sulfur recipes. The homopolymers of our acrylate monomers can be cured with oxides of bivalent metals (such as magnesium oxide and lead oxide), and with a hydrate of an alkali-metal silicate (such as $Na_2SiO_3 \cdot 9H_2O$) in combination with a base (such as calcium hydroxide). The preferred procedure is to vulcanize with a polyfunctional amine curing agent (such as triethylene tetramine) in admixture with a reinforcing pigment (such as carbon black).

The vulcanized homopolymers and copolymers of our perfluoro ester monomers (employed in major proportion by weight in forming the copolymers) can be used to provide nonflamable coatings, liners and gaskets which have exceptional utility for purposes where the previously mentioned properties are of critical importance—such as uses where extreme resistance to air, ozone, nitric acid, gasoline, lubricants, hydraulic fluids, or solvents is needed in combination with both low-temperature flexibility and high-temperature stability. Molded, extruded and cast articles of varied and useful shapes can be manufactured.

PREPARATION OF ALCOHOLS

The novel perfluoro methoxy, ethoxy, propoxy and butoxy alcohols used in preparing our acrylate esters have approximately the measured physical properties given in the following table, which lists the boiling points (at 740 mm.), and the refractive indicies and densities at 25° C.

| Formula | B. P. (° C.) | $n_D^{25}$ | $d_4^{25}$ |
|---|---|---|---|
| $CF_3OC_2F_4CH_2OH$ | 98 | 1.289 | 1.595 |
| $C_2F_5OC_2F_4CH_2OH$ | 106 | 1.287 | 1.600 |
| $C_3F_7OC_2F_4CH_2OH$ | 120 | 1.289 | 1.650 |
| $C_4F_9OC_2F_4CH_2OH$ | 136 | 1.292 | 1.698 |

These 3-perfluoroalkoxy-1,1-dihydroperfluoropropyl alcohols can be prepared by the lithium aluminum hydride reduction of the methyl (and ethyl) esters of the normal perfluoro(beta-alkoxypropionic) acids. Thus:

$$F(CF_2)_nOCF_2CF_2COOCH_3 \xrightarrow{LiAlH_4} F(CF_2)_nOCF_2CF_2CH_2OH$$

The position of the ether oxygen atom and the degree of stability of its linkage to the adjacent carbon atoms, are of critical importance to the success of the reduction process. It was not obvious that the process would be successful owing to the possibility of decomposition. Such decomposition, preventing a useful yield of the desired alcohol, has resulted when other processes have been tried, such as direct catalytic hydrogenation at high pressures.

The following experimental example illustrates the process by describing the preparation of the methoxy alcohol; the other alcohols can be prepared in a similar manner.

The apparatus was a 3000 ml. 3-neck flask equipped with a stirrer, a reflux condenser, a dropping funnel, and a gas inlet tube for passing dry nitrogen through the system. The apparatus was oven dried at 120° C. and assembled hot with a dry nitrogen stream flowing to exclude moisture. The lithium aluminum hydride was crushed in a mortar under a dry nitrogen atmosphere. Care must be used in handling LiAlH₄ as it is very sensitive to moisture and carbon dioxide in the air, inflames spontaneously with water, and flashes when powdered without protection. (In case of fire, nitrogen or dry sodium chloride should be used as an extinguisher.) Face shields, gloves, and barricades should be employed as a routine precaution in working with LiAlH₄.

The flask was charged with 1250 ml. of dry diethyl ether, and 30 grams (0.79 mole) of dry LiAlH₄ was added. The suspension was stirred for two hours (which is usually sufficient) to cause solution of the LiAlH₄, leaving a slight haze of insoluble impurities in suspension. (The appearance of the solution depends on the quality of the LiAlH₄; a rather dark opaque appearance is not uncommon.)

With the flask cooled in an ice bath and the stirrer operating, dropwise addition was made of a mixture of 200 ml. of dry diethyl ether and 228 grams (0.935 mole) of methyl perfluoro(beta-methoxyproprionate)

$$CF_3OC_2F_4COOCH_3$$

The addition rate was controlled to produce a gentle reflux of the ether, and stirring was continued for an hour after addition had been completed, with a flow of dry nitrogen being maintained.

The flask was then cooled in an ice-salt mixture and anhydrous methanol was added dropwise to decompose excess LiAlH₄. (Warning: Nitrogen must be flowing through the apparatus to eliminate the considerable danger of fire and violent explosion.) Then an ice-cold solution of 156 grams (1.5 moles) of concentrated sulfuric acid in 200 ml. of water was added with continued cooling and stirring. This resulted in the formation of two layers in the flask, an upper ether layer and a bottom aqueous layer. The two layers were separated; the bottom layer was extracted three times with ether; and the ether extracts were combined with the upper layer material.

The ether mixture was distilled in a column of 4 theoretical plates to remove the ether. The residue was charged to an efficient distillation column (8–10 plates) for purification. After the removal of the lower boiling impurities, an azeotrope of the desired alcohol and water (B. P. 83–84° C. at 740 mm.) was collected. The condensed material separated into two layers. The lower layer (alcohol layer) was returned to the column, and the process was continued until dry alcohol was obtained. The desired 3-perfluoromethoxy-1,1-dihydroperfluoropropyl alcohol, $CF_3OC_2F_4CH_2OH$, was obtained in a yield of 170 grams (84% yield).

*Preparation of alkyl esters.*—The methyl ester used in the above process was prepared as follows: To a flask cooled in an ice bath was added 63 grams (1.96 moles) of analytical grade methyl alcohol. To the cooled alcohol was added 144 grams (1.47 moles) of sulfuric acid at such a rate that the temperature of the mixture did not exceed 25° C. Then 226 grams (0.981 mole) of perfluoro(beta-methoxypropionic) acid was added and the mixture was allowed to stand for 30 minutes. It was then charged to a fractionating still and rapidly distilled. The crude ester was collected at a boiling range of 80–84° C. and amounted to 240 grams. After addition of 10 grams of $P_2O_5$, the fraction was carefully redistilled in a column of 20–30 theoretical plates. The desired methyl perfluoro(beta-methoxypropionate), $CF_3OC_2F_4COOCH_3$, had a boiling point of 83–84° C. (at 740 mm.) and was recovered in a yield of 228 grams. The refractive index at 27° C. was 1.286.

*Preparation of acids.*—The perfluoro(beta-alkoxypropionic) acids used for making the methyl esters can be readily prepared by hydrolysis of the corresponding sodium or potassium salts, by adding the salt to concentrated sulfuric acid and distilling off the perfluoro acid. The salts can be readily prepared by hydrolyzing the corresponding acid fluorides in aqueous NaOH or KOH solution. The perfluoro(beta-alkoxypropionyl) fluorides, $F(CF_2)_nOCF_2CF_2COF$, can be obtained in useful yields from the corresponding hydrocarbon beta-alkoxypropionyl fluorides and chlorides by dissolving the latter in anhydrous hydrogen fluoride and electrolyzing the solution in a nickel-anode, iron-cathode cell at 0–20° C. and atmospheric pressure, the applied cell voltage being approximately 5–6 volts. Depending on the volatility of the particular acid fluoride product and the operating conditions, it will evolve with the cell gases or will settle to the bottom of the cell, and can be recovered by fractional distillation.

The preparation of these ancillary compounds is described in more detail in the companion application of T. J. Brice, W. H. Pearlson and H. M. Scholberg, since issued as Patent No. 2,713,593 on July 19, 1955.

PREPARATION OF ESTER MONOMERS

The polymerizable acrylate ester monomers of this invention cannot be readily formed by esterification of acrylic acid with the fluorinated alcohol unless a suitable promoter is used, such as perfluoroacetic anhydride, but are readily prepared when the latter is employed. Another procedure is to react the acid chloride derivative of acrylic acid (acrylyl chloride) with the alcohol. Both procedures will be illustrated in the following experimental examples.

Measured physical properties of the methoxy, ethoxy, propoxy and butoxy species of normal 3-perfluoroalkoxy-1,1-dihydroperfluoropropyl acrylate esters, all of which are liquid at normal temperatures, are given in the following table, which lists the vacuum boiling points at the specified pressures, and the refractive indices and densities at 20° C.

| Formula | B. P. (° C.) | $n_D^{20}$ | $d_4^{20}$ |
| --- | --- | --- | --- |
| $CH_2{:}CHCOOCH_2C_2F_4OCF_3$ | 54 (50 mm.) | 1.328 | 1.421 |
| $CH_2{:}CHCOOCH_2C_2F_4OC_2F_5$ | 52 (30 mm.) | 1.320 | 1.460 |
| $CH_2{:}CHCOOCH_2C_2F_4OC_3F_7$ | 44 (9 mm.) | 1.319 | 1.511 |
| $CH_2{:}CHCOOCH_2C_2F_4OC_4F_9$ | 48 (5 mm.) | 1.319 | 1.557 |

The effect of the ether oxygen atom in decreasing both the refractive index and the density of the liquid esters is evident from a comparison of the values given above for the first-named ester (methoxy type) with those for the corresponding ester that does not contain an ether oxygen atom but which likewise contains three fluorinated carbon atoms in the molecule, namely, 1,1-dihydroperfluorobutyl acrylate, $CH_2{:}CHCOOCH_2CF_2CF_2CF_3$. The latter has a refractive index of 1.332 and a density of 1.455, both taken at 20° C. Also note that the refractive index of the third-named ester (propoxy type) is a 1.319, whereas that of 1,1-dihydroperfluorohexyl acrylate is 1.328, both taken at 20° C. These comparison values are taken from the aforesaid Patent No. 2,642,416.

*Example 1*

The apparatus was a dry 50 ml. 4-neck flask equipped with a thermometer, dropping funnel, water-cooled reflux condenser connected to a drying tube containing calcium chloride, gas inlet tube, magnetic stirrer, and electric heating mantle. The equipment was dried at 120° C. and assembled hot. Dry nitrogen was slowly flowed in through the gas inlet tube (at the rate of about 1 bubble per second).

The flask was charged with 13.6 grams (0.150 mole) of acrylyl chloride, $CH_2{:}CHCOCl$, and 0.3 gram of hydroquinone (serving as a polymerization inhibitor). The mixture was stirred and heated to reflux, with nitrogen flowing. Dropwise addition over a seven hour period was made of 13.3 grams (0.052 mole) of 3-perfluoroethoxy-1,1-dihydroperfluoropropyl alcohol, $$C_2F_5OC_2F_4CH_2OH$$

after which refluxing and stirring were continued for an additional two hours to complete the reaction.

The reaction mixture was distilled through a column (about 5 theoretical plates) and two main fractions were collected after removal of the unreacted acrylyl chloride. The first fraction weighed 14.2 grams, had a boiling range of 45–54° C. (at 30 mm.), and a refractive index of 1.3225 (at 24° C.). The second fraction weighed 1.6 grams, had a boiling range above 54° C. (at 30–35 mm.), and a refractive index of 1.3736 (at 24° C.). The first fraction was washed with four 5 ml. portions of 5% sodium carbonate solution and one 5 ml. portion of distilled water, being separated in each case from the aqueous layer. The organic layer from the last separation was dried over 0.5 gram of anhydrous magnesium sulfate and filtered. (The aqueous washings and the solid drying agent were subsequently extracted with ether which was dried and evaporated to obtain an additional 0.8 gram of the desired ethoxy ester monomer of about 90–95% purity.)

The dried organic filtrate, after adding 0.1 gram of hydroquinone, was carefully fractionated into three fractions in a column of about 25 theoretical plates, containing small copper coils (to inhibit polymerization) interspersed with a "Heli-Pak" packing made of "Hasteloy–B" metal. The second fraction weighed 9.4 grams, had a boiling point of 53–54° C. (at 30 mm.), a refractive index of 1.3183 (at 25° C.), and was identified by analysis as the desired ethoxy acrylate ester monomer in relatively pure form. Analysis showed 29.8% C (calc. 30.0%) and 53.6% F (53.4% calc.).

*Example 2*

To a 100 ml. 3-neck flask, equipped with a thermometer, dropping funnel, water-cooled reflux condenser, and stirrer, containing 0.2 gram of hydroquinone, was added 11.0 grams (0.153 mole) of acrylic acid. The mixture was cooled to 15° C. by a cold water bath (6° C.). Then addition was made of 1 ml. of perfluoroacetic anhydride in four portions at 15° C. The mixture was cooled to 13° C. and the remainder of the anhydride, to make a total of 33.6 grams (0.160 mole), was added at such a rate that the temperature did not exceed 13–15° C. The solution was stirred for a further period of 15 minutes at 14–16° C. The solution was cooled to 10° C. and rapid addition (5 minutes) was made of 46.0 grams (0.1455 mole) of normal 3-perfluoropropoxy-1,1-dihydroperfluoropropyl alcohol, $C_3F_7OC_2F_4CH_2OH$. The cooling bath was removed and the heat from the exothermic reaction raised the temperature of the solution to 33° C. in 15 minutes. The solution was warmed up to 40° C. by means of a warm water bath. This temperature was maintained by heating the bath with the small flame of a microburner for the remainder of the total four-hour reaction period (counting from the time when the alcohol was added).

The reaction solution was cooled to 10° C. and cool aqueous 10% NaCl (45 ml., an amount equal to approximately one-half the weight of the reaction mixture) was slowly added at a maximum temperature of about 15° C., to hydrolyze the excess anhydride. (It is believed that this consisted in part of perfluoroacetic anhydride and a mixed anhydride of trifluoroacetic acid and acrylic acid formed during the process.) Two layers were formed. The lower (organic) layer was mechanically separated by means of a separatory funnel, and was returned to the flask, cooled to 10–15° C., treated with 22 ml. of 10% NaCl (cooled to below 15° C.), and the organic layer separated in the separatory funnel. This treatment was repeated four more times. The final wash was given with a mixture of 15 ml. of 13% $Na_2CO_3$ and 10 ml. of 5%

NaCl. The resultant undried organic layer weighed 50.6 grams (94.1% crude yield) and was dried over night with 1.0 gram of anhydrous magnesium sulfate. The mixture was filtered, and the filtrate (49.3 grams) was mixed with 0.2 gram of hydroquinone and distilled in the same 25-plate column mentioned in the preceding example.

The fraction boiling at 44–45° C. (at 9 mm.) was recovered in a yield of 45.6 grams. It had a refractive index of 1.3190; and was identified by analysis as the desired propoxy acrylate ester monomer in substantially pure form. The yield was 85%. Analysis showed 29.1% C (29.2% calc.) and 56.4% F (56.5% calc.).

PREPARATION OF ESTER POLYMERS

Emulsion polymerization in an aqueous vehicle to obtain a latex dispersion is the generally preferred procedure. The following are typical emulsion recipes:

|  | Parts by weight | |
|---|---|---|
|  | (A) | (B) |
| Ester monomer (or mixture with co-monomer) | 100 | 100 |
| Water (deoxygenated) | 180 | 180 |
| "Duponol ME" (sodium lauryl sulfate) | 3 | 3 |
| Borax | 2 |  |
| Na$_2$S$_2$O$_8$ | 1 |  |
| K$_2$S$_2$O$_8$ |  | 0.5 |

The reaction vessel is charged with the aqueous phase, the air is flushed out with nitrogen, and then the ester monomer is added. The vessel is sealed and the mixture is heated at a temperature of about 50° C. and stirred or agitated for about 2½ to 6 hours, the higher esters requiring longer reaction times. The resultant latex is stable and can be stored. It can be used as such; for instance, as an impregnating, coating or casting composition.

The latex can be diluted and frozen to coagulate the rubbery polymer, which is then washed with water and dried at 50° C. for 24 hours, resulting in a dried polymer mass that is tacky and will stick to a glass container.

The homopolymers of the methoxy and ethoxy esters have good snappy elastic properties. The homopolymers of the propoxy and butoxy esters are somewhat inferior in rubbery properties, although much improved by vulcanization.

A similar emulsion polymerization procedure can be employed for making heteropolymers, employing a charging mixture of our ester monomer in major proportion by weight with one or more co-monomers. Thus copolymers of our alkoxy type monomers with corresponding perfluoro acrylate ester monomers that do not contain an ether-oxygen atom (cf. U. S. Patent 2,642,416), can be made by using the above recipes but with a mixture of the comonomers. Copolymers with butadiene can be made in a similar way by charging butadiene to the vessel, the total monomer charge being figured as 100 parts in following the recipe. In this case reaction times vary from 3 to 24 hours at 50° C. For best results, conversions should not be carried beyond 65–70%. An antioxidant, such as phenyl beta-naphthylamine, should preferably be added, either to the latex or by milling it into the dried copolymer mass. This procedure was employed in preparing the rubbery butadiene copolymers to which subsequent reference is made.

Using a similar procedure, other copolymers have been prepared which further illustrate the utility of our perfluoro ester monomers when employed in major proportion by weight in preparing novel and useful copolymers with various comonomers; and which further demonstrate the general ability to copolymerize with other polymerizable monomers containing an ethylenic linkage, as previously mentioned.

For instance, emulsion copolymerization of our methoxy ester with acrylonitrile in 1:1 mol ratio yielded a coagulated and dried copolymer product which was a strong flexible plastic having a glass temperature of −15° C. The molecular weight was high as shown by an inherent viscosity value of 2.3 determined in a solvent system comprising acetone and methyl perfluorobutyrate in 2:1 ratio. Emulsion copolymerization of our methoxy ester with methyl acrylate yielded a product which was a strong, snappy rubber having very good low temperature properties and a glass temperature of −37° C. The molecular weight was quite high as shown by an inherent viscosity value of 3.0 as determined in the same solvent system mentioned above. The following recipe was used in both cases:

|  | Parts by weight |
|---|---|
| Monomers (total) | 100 |
| Water | 180 |
| "Duponol ME" | 5.0 |
| K$_2$S$_2$O$_8$ | 0.3 |

Polymerization was effected at a temperature of 50° C. during a period of 18 hours. Conversions were close to 100%.

Bulk and solution polymerization procedures can also be employed to make rubbery polymers. Mercaptan or other chain transfer agents can be employed to obtain polymers of lower average molecular weight, including liquid polymers. The latter can be vulcanized to obtain solid rubbery or non-rubbery materials.

VULCANIZATION

The following compounding formula used in the vulcanization of our acrylate homopolymers, and of copolymers of our ester monomers with butadiene, illustrates the use of an alkali-metal silicate in combination with a base:

|  | Parts |
|---|---|
| Polymer | 100 |
| Na$_2$SiO$_3$·9H$_2$O | 6.72 |
| Ca(OH)$_2$ | 2.72 |

The curing ingredients were worked into the rubbery polymer on a small two-roll mill at 60° C. Samples were cured in the form of test strips in a press at 1800 p. s. i. for 1 hour at 150° C.

Resistance to solvents of the vulcanized test strips was determined by measuring the percent increase in volume (swell) upon immersion for 48 hours at 25° C. in: (A) a 70:30 mixture of iso-octane and toluene, (B) iso-octane, and (C) benzene. Flexibility at low temperatures was determined, by measuring the torsional modulus at 25° C. in a Gehman apparatus, and then measuring the modulus at reduced temperature to determine the temperature at which the modulus is ten times the value for 25° C. (This temperature is the Gehman "T$_{10}$" value.)

Values for vulcanized rubbery homopolymers of the methoxy, ethoxy, propoxy and butoxy esters are given in th the following table:

| Type | Percent swell (48 hours at 25° C.) in: | | | T$_{10}$(° C.) |
|---|---|---|---|---|
|  | Iso-octane: toluene (70:30) | Iso-octane | Benzene |  |
| Methoxy | 10 | 7 | 16 | −32 |
| Ethoxy | 10–15 |  | 7–12 | −23 |
| Propoxy | 12 | 7 | 13 | −35 |
| Butoxy | 2 | 13 | 29 | −31 |

Comparative tests have shown that the resistance to swelling is approximately as good as in the case of the corresponding vulcanized rubbery homopolymers of the prior perfluoro acrylates that do not contain an ether-oxygen atom; but the Gehman T$_{10}$ values are 15 to 30° C. lower.

The vulcanized butadiene copolymers have less solvent resistance (i. e. a greater swelling volume) but the Gehman T$_{10}$ values are lower; values as low as −50 to −60° C. having been obtained for copolymers containing 20 mol percent of the acrylate component (as determined by analysis of the polymers).

The following data illustrates vulcanization of two butadiene copolymers with sulfur recipes. The polymers were rubbery copolymers of the ethoxy-type acrylate ester and butadiene, having 48:52 and 20:80 mol ratios thereof, respectively (the corresponding monomer ratios by weight being 82:18 and 56:44, respectively). The compounding formula was:

| | Parts |
|---|---|
| Polymer | 100 |
| Stearic acid | 1 |
| ZnO | 5 |
| Accelerator ("Altax") (benzothiazyl disulfide) | 1.5 |
| Sulfur | 2 |
| EPC carbon black ("Sphereon" No. 9) (easy processing channel black) | 35 |

The ingredients were mixed together on a mill at 60° C. Vulcanization of test strips was performed in a press at 1800 p. s. i. for 45 minutes at 150° C. These strips had strong, snappy elastic properties. The following physical properties were measured:

| | Type | |
|---|---|---|
| | 48:52 | 20:80 |
| Tensile strength (p. s. i.) | 350 | 1,650 |
| Percent elongation at break | 40 | 140 |
| Percent set | 0 | 3 |
| $T_{10}$ (° C.) | −41 | −56 |

Sample strips were immersed in dioctyl sebacate for 70 hours at 100° C. and the percent swell was measured; the value for the vulcanized 48:52 copolymer was 15% and that for the 20:80 copolymer was 79%.

Samples were immersed in the following organic fuels and solvents for 48 hours at 25° C. and the measured percent swell values were found to be as follows:

| Solvent | Type | |
|---|---|---|
| | 48:52 | 20:80 |
| Iso-octane:toluene (70:30) | 50 | 130 |
| Benzene | 50 | 130 |
| Toluene | 45 | 130 |
| Iso-octane | 30 | 85 |
| Methyl isobutyl ketone | 45 | 90 |

The above data show that both types of vulcanized copolymers have useful properties. In this case the copolymer having the high butadiene ratio is stronger, more elastic, and has better low-temperature properties, but the 48:52 copolymer has better resistance to fuels and solvents.

A rubbery 54:46 copolymer of the methoxy-type acrylate ester and butadiene was vulcanized with sulfur in the manner described above and test strips were found to have the following properties:

| | |
|---|---|
| Tensile strength (p. s. i.) | 2,050 |
| Elongation at break (%) | 450 |
| $T_{10}$ (° C.) | −38 |
| Percent swell after 48 hours at 25° C. in: | |
| Iso-octane:toluene (70:30) | 60 |
| Iso-octane | 20 |
| Benzene | 60 |

The preferred procedure for obtaining good flexibility at low temperatures and the maximum resistance to fuels, oils, solvents and hydraulic fluids, is to employ the homopolymers of our methoxy and ethoxy type acrylate esters and to vulcanize with a polyfunctional amine curing agent (such as triethylene tetramine) in admixture with a reinforcing pigment (such as carbon black).

The following table gives illustrative compounding formulas:

| | Parts by weight | |
|---|---|---|
| | (A) | (B) |
| Polymer | 100 | 100 |
| Stearic acid | 1 | 1 |
| HAF carbon black ("Philblack O") (high abrasion furnace black) | 35 | 35 |
| Sulfur | 1 | 1 |
| Triethylene tetramine | 1 | 1.75 |

Using a rubbery methoxy homopolymer in the above formulas, samples were made up by mixing the ingredients on a rubber mill at 60° C. and vulcanizing strips in a press for one hour at 150° C. Vulcanization in each case transformed the polymer from a thermoplastic material to a strong and elastic rubber, but product (B) was not as strong or elastic as product (A). The vulcanized polymers had the following properties:

| | (A) | (B) |
|---|---|---|
| Tensile strength (p. s. i.) | 1,060 | 620 |
| Elongation at break (percent) | 270 | 90 |
| Set at break (percent) | 8 | 4 |
| $T_{10}$ (° C.) | −25 | −22 |
| Brittle point (° C.) | −37 | −39 |
| Percent swell after 48 hours at 25° C. in: | | |
| Iso-octane:toluene (70:30) | 23 | 14 |
| Benzene | 26 | 18 |
| Acetone | 59 | 61 |
| Ethyl acetate | 69 | 73 |
| Iso-octane | | 9 |
| Methyl isobutyl ketone | | 33 |
| Methyl ethyl ketone | | 62 |
| Ethyl alcohol | | 9 |
| Sodium hydroxide (10%) | | 160 |
| Sulfuric acid (10%) | | 3 |

Sample strips were immersed in white fuming nitric acid for one week at 25° C. and swelled only 30–40%. They showed no sign of deterioration and remained strong and rubbery. A sample strip of vulcanized polymer (B) was heated in air for 100 hours at 177° C. and showed only a 35% loss of strength and no change in ultimate elongation. Another sample was immersed in a dioctyl sebacate type of synthetic lubricant for 100 hours at 177° C.; no swelling occurred, loss of strength was only 18%, and there was no change in elongation. Another sample was immersed in boiling water for 70 hours; it swelled 47% but was not otherwise attacked.

In respect to the above amine curing procedures, the carbon black serves as a reinforcing pigment and greatly increases the tensile strength, the sulfur prevents premature cross-linking during processing and extends the useful service life at elevated temperatures, and the stearic acid aids in processing and also catalyzes the cross linking reaction.

Vulcanization of the present polymers with polyfunctional amine curing agents is described in more detail in the companion application of P. J. Stedry, S. N. 399,575, filed on Dec. 21, 1953, since issued as Patent No. 2,811,501 (Oct. 29, 1957).

We claim:

1. As new and useful compounds, the normal 3-perfluoroalkoxy-1,1-dihydroperfluoropropyl acrylate monomers having the formula:

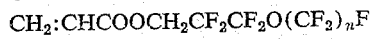

where $n$ has an integer value of 1 to 4.

2. Homopolymers of the acrlylate monomers specified in claim 1.

3. Copolymers of butadiene and, in major proportion by weight, the acrylate monomers specified in claim 1.

4. Polymers having a skeletal chain containing, in major proportion by weight, fluorinated alkoxy acrylate ester units indicated by the formula:

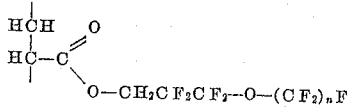

where $n$ has an integer value of 1 to 4.

5. Vulcanized polymers having a skeletal chain containing, in major proportion by weight, fluorinated alkoxy acrylate ester units indicated by the formula:

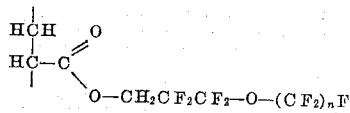

where $n$ has an integer value of 1 to 4.

6. Vulcanized rubbery homopolymers of the normal 3-perfluoroalkoxy-1,1-dihydroperfluoropropyl acrylate monomers which have the formula:

$$CH_2:CHCOOCH_2CF_2CF_2O(CF_2)_nF$$

where $n$ has an integer value of 1 to 4.

7. Vulcanized rubbery copolymers of butadiene and, in major proportion by weight, the normal 3-perfluoroalkoxy-1,1-dihydroperfluoropropyl acrylate monomers which have the formula:

$$CH_2:CHCOOCH_2CF_2CF_2O(CF_2)_nF$$

where $n$ has an integer value of 1 to 4.

References Cited in the file of this patent
UNITED STATES PATENTS

| | | |
|---|---|---|
| 2,592,069 | Reid | Apr. 8, 1952 |
| 2,628,958 | Bittles | Feb. 17, 1953 |
| 2,642,416 | Ahlbrecht et al. | June 16, 1953 |